(12) United States Patent
Webster

(10) Patent No.: US 6,501,792 B2
(45) Date of Patent: Dec. 31, 2002

(54) SERIAL DIGITAL DATA COMMUNICATIONS RECEIVER WITH IMPROVED AUTOMATIC CABLE EQUALIZER, AGC SYSTEM, AND DC RESTORER

(75) Inventor: Stephen Paul Webster, Oakville (CA)

(73) Assignee: Gennum Corporation, Burlington (CA)

( * ) Notice: Subject to any disclaimer, the term of this patent is extended or adjusted under 35 U.S.C. 154(b) by 0 days.

(21) Appl. No.: 09/946,799

(22) Filed: Sep. 6, 2001

(65) Prior Publication Data

US 2002/0034221 A1 Mar. 21, 2002

Related U.S. Application Data

(62) Division of application No. 09/055,515, filed on Apr. 6, 1998, now Pat. No. 6,304,615.

(30) Foreign Application Priority Data

Apr. 4, 1997 (CA) .............................................. 2201834

(51) Int. Cl.[7] ................................................. H03H 7/30
(52) U.S. Cl. ......................... 375/232; 333/18; 330/304
(58) Field of Search ............................... 375/232, 229, 375/230; 333/18, 28; 330/304

(56) References Cited

U.S. PATENT DOCUMENTS

| | | | |
|---|---|---|---|
| 4,041,418 A | * 8/1977 | Koeth | .......................... 333/18 |
| 4,590,394 A | 5/1986 | Pace | |
| 4,862,103 A | 8/1989 | Funada | |
| 5,099,366 A | 3/1992 | Ahlgrim | |
| 5,606,284 A | 2/1997 | Tamesue et al. | |
| 5,761,251 A | 6/1998 | Wender | |
| 5,841,810 A | * 11/1998 | Wong et al. | ................. 330/304 |

FOREIGN PATENT DOCUMENTS

| | | |
|---|---|---|
| DE | 35 45 263 | 6/1987 |
| EP | 0 073 400 | 3/1983 |
| EP | 0 437 945 | 7/1991 |
| EP | 0 611 059 | 8/1994 |
| FR | 2 665 808 | 2/1992 |

OTHER PUBLICATIONS

Webster et al.: "A New Chip Set For Proposed SMPTE Standard SMPTE 259M —Serial Digital Interface" SMPTE Journal, vol. 102, No. 9, Sep. 1, 1993, pp. 777–785, White Plains, NY.

* cited by examiner

Primary Examiner—Stephen Chin
Assistant Examiner—Kevin Kim
(74) Attorney, Agent, or Firm—Bereskin & Parr

(57) ABSTRACT

A serial digital data communications receiver with an improved automatic cable equalizer that is less susceptible to jitter and has greater multi-standards capability, and an improved automatic gain control system with a DC restorer that provides optimal edge jitter performance while avoiding the possibility of a latch-up condition at the start of data transmission. The automatic cable equalizer for equalizing signals received over cables of different lengths has multiple stages each having a transfer function of $1+K_i[f_i(j\omega)]$ wherein each of the $K_i$ vary in accordance with a sequential gain control methodology. The AGC system uses the difference between band-pass filtered versions of the amplitudes of the input and output of a DC restorer based on quantized feedback, to regulate the AGC circuit. The DC restorer comprises a comparator for generating a quantized output and further clamps the input with a clamping circuit so that a version of the quantized output is fed back to the input while avoiding the possibility of operational failure of the comparator at the onset of data transmission.

3 Claims, 6 Drawing Sheets

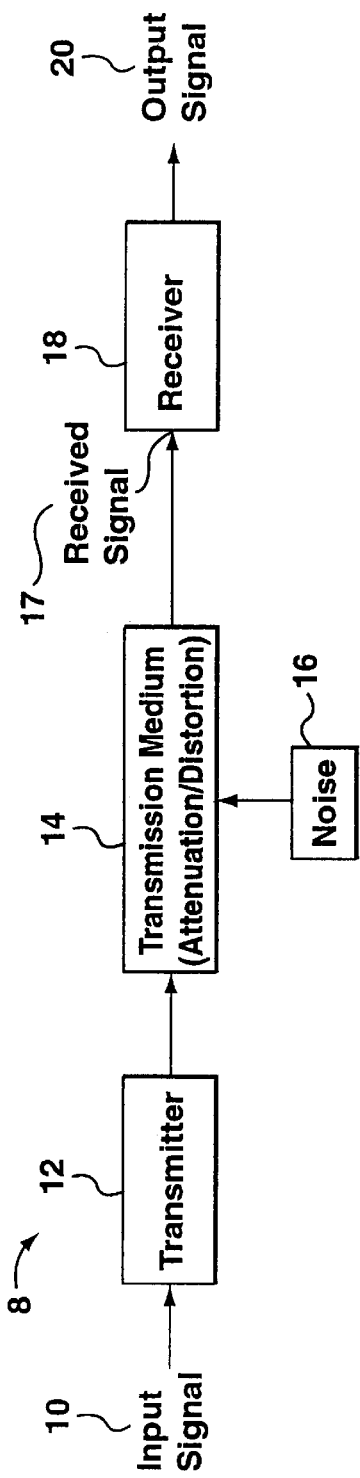
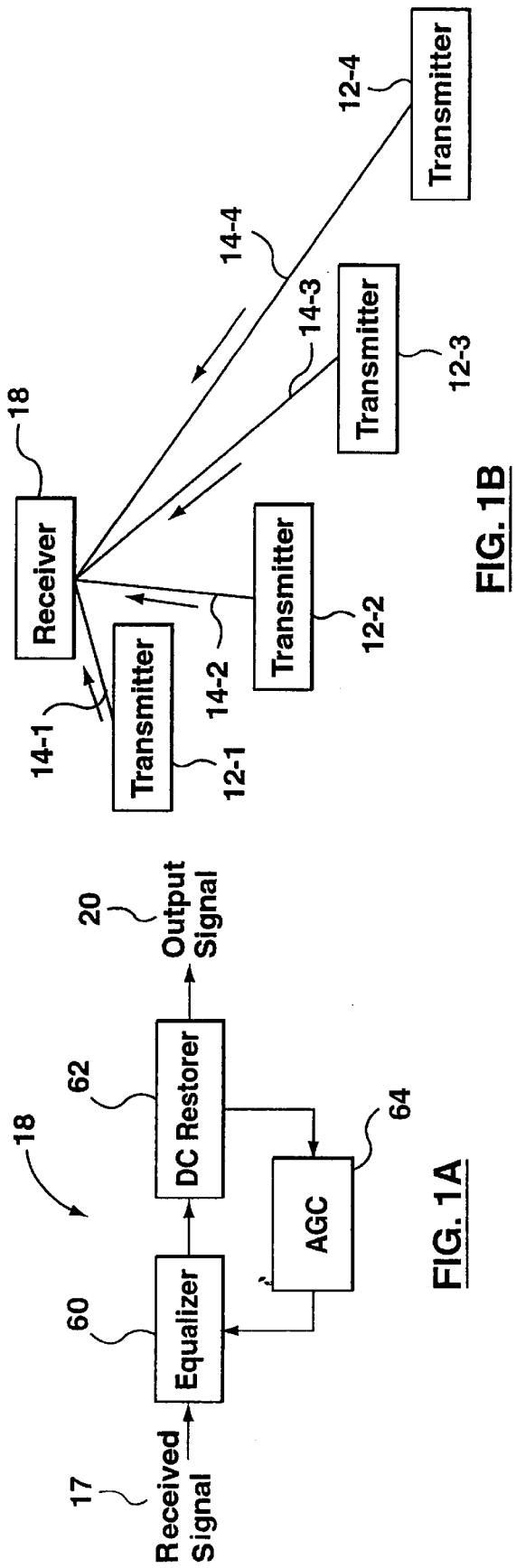
FIG. 1
FIG. 1A
FIG. 1B

SERIAL DIGITAL DATA COMMUNICATIONS RECEIVER WITH IMPROVED AUTOMATIC CABLE EQUALIZER, AGC SYSTEM, AND DC RESTORER

FIELD OF THE INVENTION

The present invention relates to the fields of communications, digital data communications, receivers, digital data receivers, equalizers, cable equalizers, automatic gain control (AGC) systems, DC restorers, and quantized feedback (QFB) DC restorers.

BACKGROUND OF THE INVENTION

FIG. 1 shows the concept of a basic communication system 8 including a transmitter 12, a transmission medium 14 (such as a cable or wire) which is corrupted by noise 16, and a receiver 18. In serial digital data communications, the input signal 10 consists of an input pulse train or sequence. The input signal 10 is attenuated and distorted by the medium 14, through which it is transmitted, before a received signal 17 arrives at the receiver 18 which after processing the signal 17 provides the output signal 20. Distortion is caused by variable delay (dispersion) and variable attenuation of high frequency components. This distortion results in pulse spreading and consequential interference between neighbouring pulses known as ISI (intersymbol interference).

As shown in FIG. 1A, receiver 18 may typically include an automatic or adaptive equalizer 60 to offset the undesirable frequency effects of the cable (or other transmission medium), a DC (direct current) restorer 62 to restore or regenerate the DC component of the transmitted input, and an automatic gain control circuit 64 which provides the necessary gain for the equalizer 60, as explained below. The adaptive aspect of the cable equalizer is particularly useful, for example, where one receiver is capable of receiving several different signals transmitted from different locations and over cables having different lengths. FIG. 1B illustrates a communications system wherein a receiver 18 receives signals from a number of different transmitters (12-1, 12-2, 12-3, and 12-4) that respectively transmit over cables (14-1, 14-2, 14-3, and 14-4) which are of different lengths. An automatic cable equalizer in the receiver 18 should be able to equalize signals which have been transmitted over any cable length between some minimum length (e.g. zero length) and some maximum length.

Theoretically, an equalizer should have a frequency characteristic that is the inverse of the transmission medium and which restores high frequency components and eliminates dispersion. In practice however, this also increases noise at the receiver by increasing the noise bandwidth and boosting high frequency noise components. As is well known in the art, the loss over a cable (such as a co-axial cable) of length L may be approximated in frequency domain terms by:

$$L(j\omega) = e^{-AL(j\omega)^{1/2}}, \omega = 2\pi f$$

where A is a constant. As is common practice and to facilitate understanding, the analysis of equalizer functionality is carried out in the frequency domain. Note that the function $L(j\omega)$ if expanded and expressed in the form of a numerator polynomial divided by denominator polynomial has an infinite number of poles and zeros. As a result, and as is further well known in the art, in a typical implementation of an automatic cable equalizer, the inverse cable loss function is approximated as:

$$G(j\omega) = 1 + Kf(j\omega)$$

where K is a control variable which varies depending on the length of the cable over which the signal was transmitted from zero at the minimum cable length to unity (or some other constant) at the maximum cable length. The equalizer function circuitry 22 is illustrated in FIG. 2 where the circuitry for providing the variable gain K is shown at 24, the circuitry which realizes the function $f(j\omega)$ is shown at 26, and the summing function is shown at 28. When the amplitude of the transmitted signal is a standard amplitude which is known, the amount by which the amplitude of the received signal (see below) has been attenuated may be used to provide an appropriate value for the gain K 25 (and correspondingly indicate the length of the cable over which the received signal was transmitted). As will be explained below, this may be obtained, via an AGC system and a DC restorer.

The poles and zeros of the function $f(j\omega)$ are chosen so that $1 + f(j\omega)$ provides a good approximation to the inverse cable loss $L(j\omega)$ at the maximum cable length. FIG. 2A illustrates a possible implementation of a circuit which may achieve an $f(j\omega)$ transfer function. Note that in FIG. 2A the $f_{in}$ and $f_{out}$ signals, which are respectively the input and output of the $f(j\omega)$ circuit, are shown as differential signals whereas in FIG. 2 these signals are shown as single-ended. Referring to FIG. 2A, transistors 74 and 76 form a differential pair whose emitter terminals are connected through an impedance network 78 (each emitter terminal is also connected to a reference through current sources 80 and 82 respectively). The impedance network typically comprises a plurality of resistor-capacitor circuits cascaded together in parallel. The values of the resistor and capacitor components define the poles and zeros of $f(j\omega)$. The collectors of transistors 74 and 76 are coupled to Vcc through resistors 70 and 72 respectively. The input to $f(j\omega)$ is applied between the base terminals of transistors 74 and 76, and the output of $f(j\omega)$ is taken between the collector terminals of 74 and 76.

The equalization approach illustrated in FIG. 2 is, however, subject to several drawbacks. First, since the best approximation to the desired inverse cable loss response occurs at the extreme values of the control variable K, i.e. when K=0 (corresponding to the minimum cable length) and when K=1 (corresponding to the maximum cable length), the accuracy of the approximation deteriorates for intermediate values of K (corresponding to intermediate cable lengths). As the accuracy of the approximation worsens, the resulting errors cause increased jitter in the recovered data.

Second, the above approach is overly susceptible to noise associated with the $f(j\omega)$ function. Typically, the function $f(j\omega)$ can provide a gain of more than 40 dB at a frequency of 200 MHz. As shown in FIG. 2, to prevent overload of the $f(j\omega)$ function by the larger input levels associated with short cable lengths, the circuitry for the gain control function K 24 must be physically placed ahead or in front of the circuitry which realizes the $f(j\omega)$ function 26. As a result, the noise associated with the function $f(j\omega)$ is never attenuated and is always present at the output, irrespective of the value of K. Again, this causes an increase in jitter, particularly for lower values of K.

Third, the function $G(j\omega)$ is also chosen to delay high frequency signals in an inverse manner to the dispersion characteristic of the cable. When K is varied, the delay through the equalizer is also varied. Therefore when K varies in an undesirable manner, for example due to the presence of noise on the K controlling signal 25, the resulting delay modulation further contributes to jitter.

In addition, ideally a cable equalizer capable of multi-standards operation should be able to trade cable length for data rate as cable length is varied (for e.g., 800 Mbits/second at 100 metres, 200 Mbits/seconds at 400 metres). To minimize noise and ensure stability, the bandwidth of the function $G(j\omega)$ should also vary inversely with cable length. In practice, however, adding circuitry for realizing a variable bandwidth function to the equalizer of FIG. 2 results in increased circuit noise and delay modulation, and therefore jitter.

The above described problems render the cable equalizer of FIG. 2 overly susceptible to producing jitter. This prior art cable equalizer is also unsuitable for multi-standards use since standards with higher data rates, and consequentially shorter critical or maximum cable lengths, fall into the non-optimal intermediate operating region and because of the increased jitter levels associated with adding circuitry for providing variable bandwidth.

As already mentioned, the receiver 18 also typically includes a DC restorer to restore the DC component of the input pulse train and thereby eliminate baseline wander. Such a DC restorer may be a clamping DC restorer or a DC restorer based on the principle of quantized feedback (QFB). Both clamping and quantized feedback restorer circuits are described in detail in U.S. Pat. No. 5,426,389, the description of said patent being incorporated herein by this reference. FIG. 3 shows a standard quantized feedback (QFB) DC restorer 100 comprising a QFB comparator 150, positive feedback resistor 154, and input AC (alternating current) coupling capacitor 152. The DATA IN signal is coupled to the positive input terminal of comparator 150 through capacitor 152 and to the output of the comparator, i.e. the DATA OUT signal, through resistor 154. The negative input terminal of comparator 150 is connected to a reference voltage $V_{ref}$. Because the restorer of FIG. 3 is configured with positive feedback, it has a bistable voltage transfer characteristic with hysteresis as illustrated in FIG. 3A. Referring to FIG. 3A, if the DATA OUT signal is low and the DATA IN signal is increasing in magnitude, the DATA OUT signal remains low until the DATA IN signal passes an upper threshold $V_H$. Subsequently the DATA OUT signal remains high until the DATA IN signal decreases below a lower threshold $V_L$. The values of $V_H$ and $V_L$ will depend on the values of resistor 154 and of capacitor 152.

The receiver 18 also typically includes an AGC circuit or an automatic control circuit which, in response to an error signal provided by a DC restorer circuit, may be used to control the K controlling signal 25. FIG. 4 shows a typical AGC system with a QFB DC restorer, such as that illustrated in FIG. 3. (Note that the AGC system 102 may include an automatic equalizer (not shown in FIG. 4) which not only adjusts the gain but also the frequency characteristic of the DATA IN signal, while, in other applications, the AGC system 102 may only provide a variable gain function to the DATA IN signal.) Although DC restorers using QFB are capable of low. edge jitter performance (i.e minimizing spurious or random signal variations during data transitions), this requires controlling the amplitude of the input signal, DATA IN, to be very nearly equal to the output quantization level (in a sense, the quantization error must be minimized), since, as may be seen from FIG. 3, the DATA OUT voltage level, once established, will tend to follow the DATA IN voltage level. Generally, an automatic gain control (AGC) circuit automatically changes the gain or amplification of a receiver to maintain the desired output signal, or its amplitude, essentially constant despite variations in input signal strength. As shown in FIG. 4, when the input signal amplitude is controlled by an AGC function 102, as for example in the case of a line equalizer, the amplitude of the DC restorer input signal as detected by 104 is typically compared to the amplitude of the quantized signal as detected by 106, and the difference, which is the quantization or AGC error signal 110, can be used to control the gain provided by the AGC circuitry 102.

However, the frequency spectrum of the quantized signal 114 and the controlled signal 112 generally differ at very low frequencies and very high frequencies since the transmitted or controlled signal 112 is AC coupled and band limited. As a result, there is a loss in the low frequency and high frequency components of the controlled signal 112 compared to the quantized signal 114 which has these components essentially reconstituted. The additional energy in the quantized reference signal 114 results in undesirably higher levels being produced by the amplitude detector 106 as compared to those produced by amplitude detector 104. This results in increased edge jitter in the output of the restorer.

In addition, a drawback of QFB DC restorers using positive feedback, such as that illustrated in FIG. 3, is that there is a 50% probability that the quantized output will be at the wrong level at the onset of data transmission. As a result, the comparator circuit may "latch-up" when data transmission first begins and operational failure of the DC restorer circuit may result, unless additional circuitry is employed to prevent such a situation. Typical solutions for avoiding this latch-up problem involve AC coupling the DATA OUT signal. However, the AC coupled output places a lower limit on the data rate and results in a deterioration of the system noise margin during periods when no data transitions occur. In addition, while clamping DC restorers are not susceptible to latch-up problems, they exhibit edge jitter performance which is inferior to QFB comparators.

SUMMARY OF THE INVENTION

In one aspect the present invention provides an equalizer circuit for receiving an input signal and for providing an equalized output signal in response, said input signal having a frequency spectrum, said frequency spectrum having been distorted by the frequency characteristic of a frequency dependent transmission line, the length of said transmission line being within a variable length range, said variable length range being defined by a minimum length limit and a maximum length limit, said variable length range also being divided into a plurality of N successive portions, said plurality of portions including at least a first portion and a last portion, each of said N portions having a portion length and each of said portions further being defined by a lower portion limit and an upper portion limit, the lower portion limit of said first portion being equal to said minimum length limit, and the upper portion limit of said last portion being equal to said maximum length limit, said equalizer circuit comprising a plurality of N successive stages each having a stage input for receiving a stage input signal and a stage output for providing a stage output signal, said plurality of stages including at least a first stage and a last stage and each one of said N stages corresponding to one of said N portions, wherein the stage input of said first stage receives said input signal, the stage output of said last stage provides said equalized output signal, and the stage output of each stage other than the last stage is coupled to the stage input of the next stage, each of said stages further comprising: (a) a frequency responsive circuit for altering the frequency spectrum of the stage input signal to provide an altered signal; (b) a variable gain circuit for amplifying said altered signal by a gain value to provide an amplified altered signal, said gain value being within the range defined by a minimum gain value and a maximum gain value, such that when said length of said transmission line is less than the lower portion limit of the portion corresponding to said stage said gain value is equal to said minimum gain value, and when said length of said transmission line is greater than the upper portion limit of the portion corresponding to said stage said gain value is equal to said maximum gain value, said gain value otherwise being variable between said minimum gain value and said maximum gain value depending on the length of said transmission line; and (c) a summing circuit for adding said stage input signal and said amplified altered signal to provide the stage output signal.

In another aspect the present invention provides a circuit for receiving an input signal and providing a controlled quantized signal in response, said circuit comprising: (a) an automatic control circuit for processing said input signal in response to an error signal so as to provide a controlled signal having a substantially constant amplitude; (b) a restorer circuit coupled to said automatic control circuit for receiving said controlled signal and providing a controlled quantized signal in response, said controlled quantized signal being equal to a first value or a second value; (c) a filter circuit coupled to said restorer circuit for band-pass filtering said controlled signal to provide a filtered controlled signal and for band-pass filtering said controlled quantized signal to provide a filtered controlled quantized signal; (d) a detection circuit coupled to said filter circuit for determining the amplitude of said filtered controlled signal and for determining the amplitude of said filtered controlled quantized signal; and (e) a difference circuit coupled to said detection circuit and to said automatic gain control circuit for determining the difference between the amplitude of said filtered controlled signal and the amplitude of said filtered controlled quantized signal and using said difference to provide said error signal, such that the amplitude of said controlled signal remains substantially equal to the amplitude of said controlled quantized signal.

In a further aspect the present invention provides a restorer circuit for receiving an input signal and for providing a quantized signal in response, said quantized signal being equal to either a first value or a second value, said restorer circuit comprising: (a) a capacitor, having first and second terminals, said first terminal of said capacitor being coupled to said input signal; (b) a comparator circuit, having a positive input terminal, a negative input terminal, and an output terminal, said positive input terminal being coupled to said second terminal of said capacitor, said negative input terminal being coupled to a reference signal, and said output signal being provided at said output terminal; (c) a clamp circuit having a clamp input for receiving said input signal and a clamp output for providing a clamped signal; and (d) a resistor, coupled between said positive input terminal and said clamped output.

BRIEF DESCRIPTION OF THE DRAWINGS

In the accompanying drawings which illustrate preferred embodiments of the present invention:

FIG. 1 illustrates a basic communication system.

FIG. 1A shows a possible block diagram of a serial digital data receiver.

FIG. 1B illustrates a communication system in which a receiver may receive signals transmitted over cables of different lengths.

DETAILED DESCRIPTION OF THE INVENTION

Figure 5:
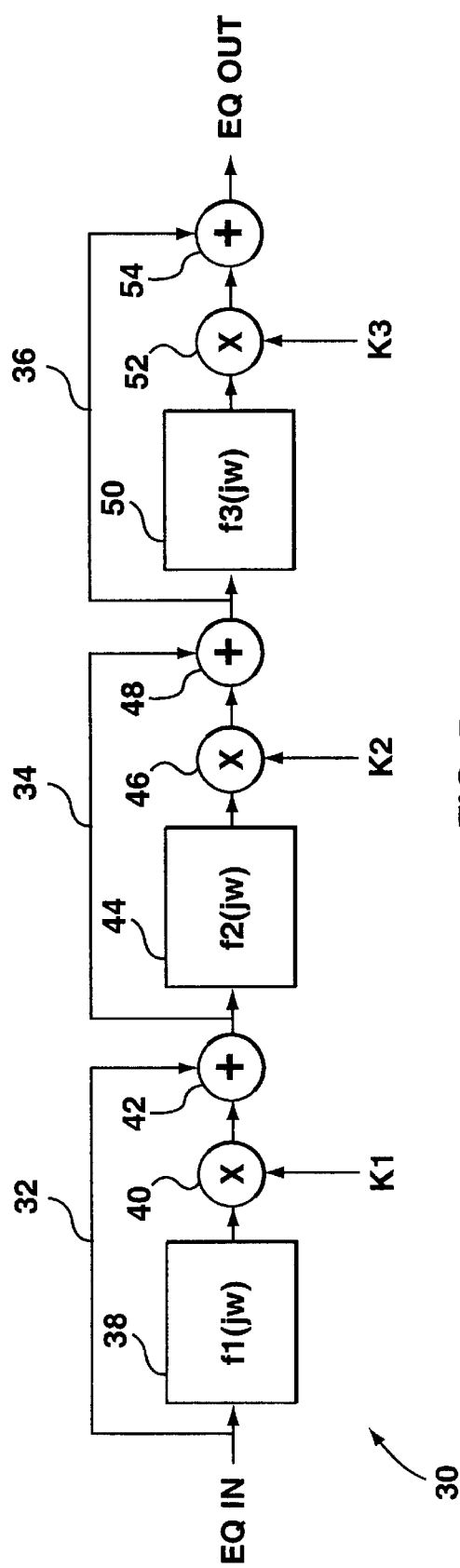
FIG. 5 is a block diagram of a possible embodiment of a multi-stage cable equalizer according to the present invention.

FIG. 5 illustrates the multi-stage cable equalizer 30 of the present invention in which successive stages 32, 34, and 36 are coupled to one another. Similarly to the equalizer circuit of FIG. 2, each of the three stages 32, 34, and 36 shown in FIG. 5 comprises circuitry which realizes an $fi(j\omega)$ function, circuitry for a gain control function Ki, and summing circuitry. These are shown at: 38, 40, and 42 respectively for the first stage 32; 44, 46, and 48 respectively for the second stage 34; and 50, 52, and 54 respectively for the third stage 36. Each stage behaves as the single stage version of FIG. 2 as far as the relationship between Ki and the equalization error is concerned. Note that while the equalizer of FIG. 5, as shown, comprises 3 stages, the cable equalizer according to the present invention can comprise any plural number N of stages.

Figure 2:
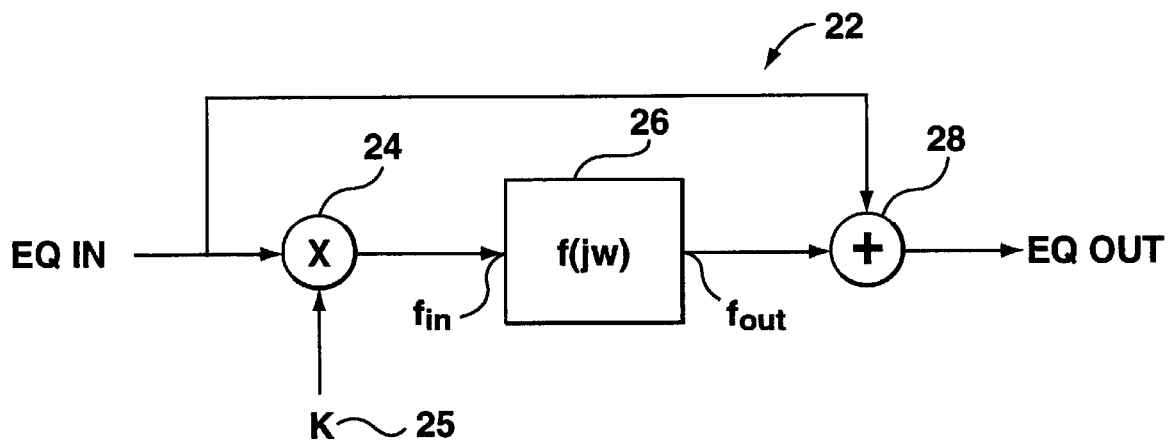
FIG. 2 is a block diagram of a prior art cable equalizer.
Figure 2A:
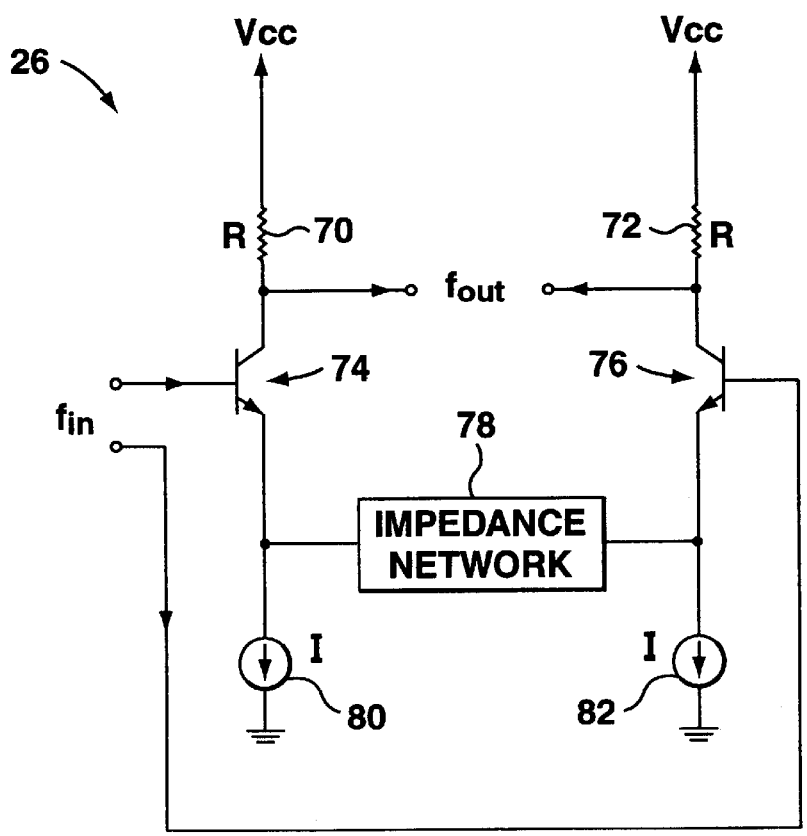
FIG. 2A illustrates a circuit which may achieve an $F(j\omega)$ function.
Figure 6:
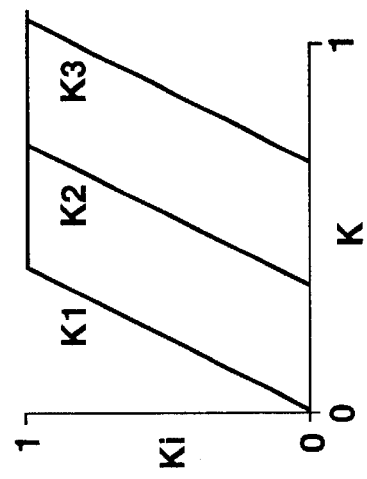
FIG. 6 illustrates a sequential controlling principle for the equalizer of FIG. 5.

According to the present invention, the drawbacks associated with the equalizer of FIG. 2 are mitigated by distributing the required equalizer transfer function over a plurality of stages and by the application of a sequential gain control methodology which preferably allows for only one stage at any time to be operating within its active control range (i.e providing a gain between 0 and 1) as the cable lengths over which received signals have been transmitted varies. FIG. 6 illustrates a preferred embodiment of the sequential control principle for the three stage cable equalizer of FIG. 5. As shown in FIG. 6, the first stage 32 is active (i.e K1 varies between 0 and 1) with K2 and K3 equal to 0 for a first portion or range of cable lengths corresponding to $0 \leq K \leq \frac{1}{3}$; the second stage is active (i.e K2 varies between 0 and 1) with K1 equal to 1 and K3 equal to 0 for a second portion of cable lengths corresponding to $\frac{1}{3} \leq K < \frac{2}{3}$; and the third stage is active (i.e K3 varies between 0 and 1) with K1 and K2 equal to 1 for a third portion of cable lengths corresponding to $\frac{2}{3} < K \leq 1$.

Figure 7:
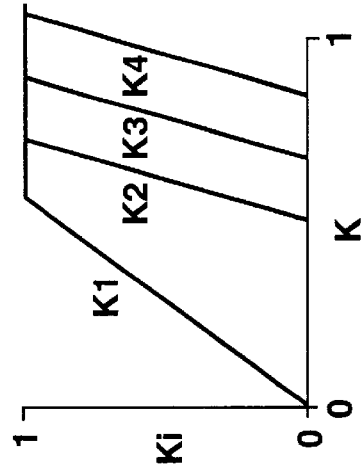
FIG. 7 illustrates a sequential controlling principle for an alternate embodiment of the equalizer according to the present invention

Alternatively, it is also possible for the distribution of the equalizer gain to be distributed over the multiple stages non-uniformly, as for instance where variations in cable length occur mainly within a certain sub-range of the overall variation of cable length. This aspect is illustrated in FIG. 7 for a cable equalizer comprising 4 stages (not shown) in which the first stage is active for portions of cable lengths corresponding to $0 \leq K \leq \frac{1}{2}$ and the remaining three stages are successively active for equal ranges of cable length as K varies between ½ and 1, as shown in FIG. 7. Note that it is clear that while the graphs of FIGS. 6 and 7 are shown with K varying from 0 to 1 on the X axis, they could equivalently be shown with the cable length varying from the minimum cable length to the maximum cable length on the X-axis. It should also be noted that the sequential gain control methodology of the present invention may also permit more than one stage to be operating within its active control range at one time or equivalently for there to be a slight overlap between the portions of cable length variation assigned to each stage of the equalizer. Preferably, however, the overlap is small, since as the range and/or ranges of overlap increase the performance of the equalizer deteriorates.

Preferably, once a signal is received, the appropriate value of K for equalizing that signal (and, in effect, the length of the cable over which that signal was transmitted) is determined from the attenuation of the received signal as compared to the original transmitted signal which was of a standard amplitude. This may be done for example by the circuit of FIG. 8 (see below) wherein the AGC circuit 102 comprises the equalizer circuit 30, and the AGC error signal 110 allows for the determination of the value of K. Once K is determined, the values of K1 to KN are determined according to a sequential gain control methodology in accordance with the present invention, as for example the methodology illustrated in FIG. 6.

Figure 7A:
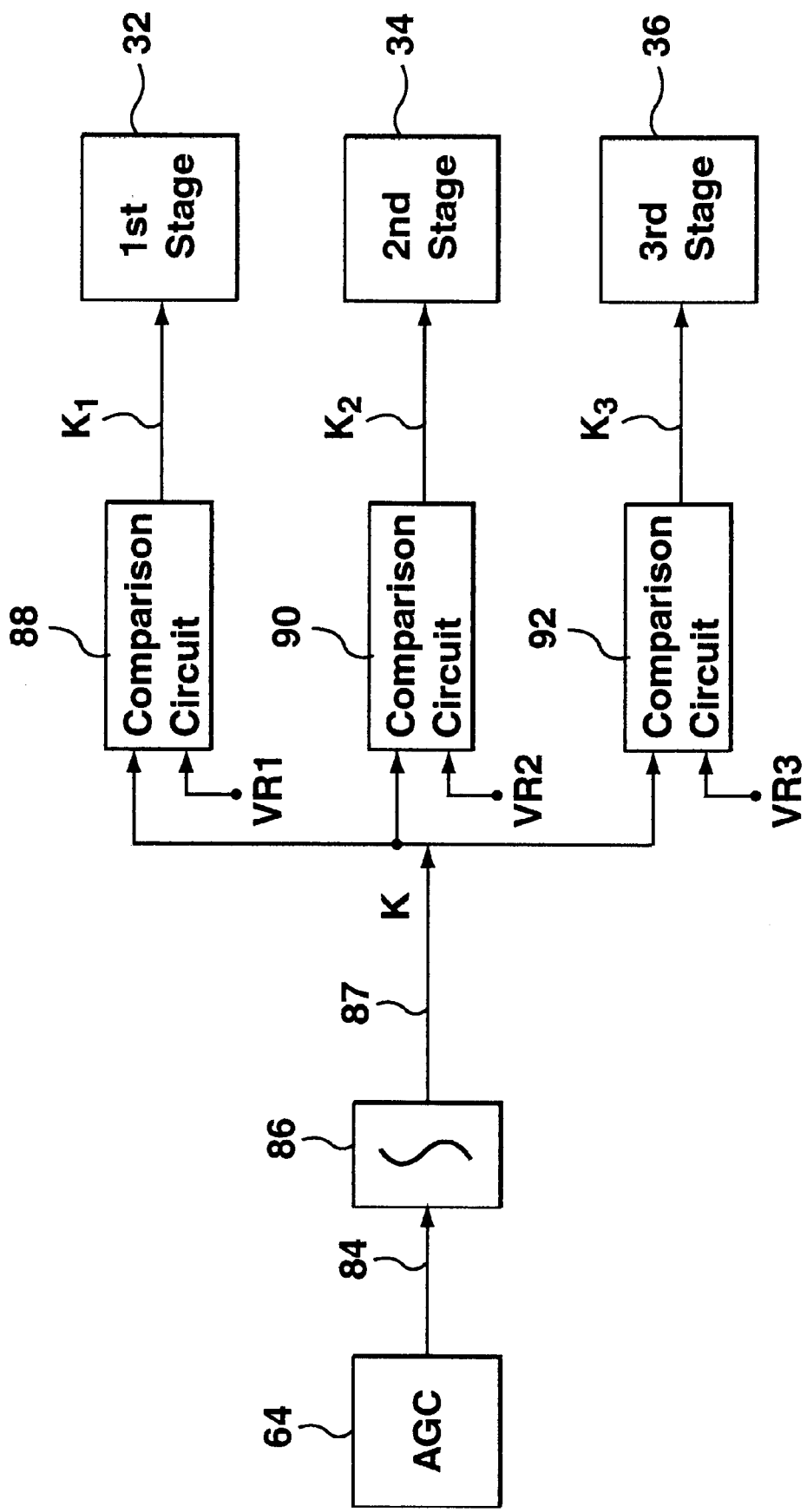
FIG. 7A illustrates a possible general implementation of the sequential controlling principle of the present invention.

Circuitry for implementing a sequential gain control methodology in accordance with the present invention is well within the knowledge of those skilled in the art. An exemplary implementation is shown generally in FIG. 7A, for a three stage equalizer circuit in accordance with the present invention. Referring to FIG. 7A, the output of an AGC circuit 64 is an output current signal 84 which is integrated by integrator 86 to provide a control voltage 87 which corresponds to the signal K. The voltage signal 87 is then provided as an input to comparison circuits 88, 90, and 92 which provide the K1, K2, and K3 signals respectively for each of the three stages 32, 34, and 36 of the equalizer circuit. Each of the circuits 88, 90, and 92 also receive a second input which are voltage references VR1, VR2, and VR3 respectively. The voltage references VR1, VR2, and VR3 for each stage are set at a voltage value which corresponds to the value of K at the mid way point of the active control range of that stage. The comparison circuits 88, 90, and 92, which may each comprise a transconductance amplifier with an output offset, provide a value of Ki equal to ½ when its two inputs are equal, a value of Ki equal to 1 (which may correspond to an upper saturation of the amplifier) when the K input larger than the VRi reference input by at least an amount $\Delta$Vi, and a value of Ki equal to 0 (which may correspond to a lower saturation of the amplifier) when the K input is smaller than the VRi reference input by at least the amount $\Delta$Vi. The value of $\Delta$Vi for each stage will be dependent on the size of the active control range for that stage with respect to K (and may correspond to the gain of the amplifier).

In the present invention, the conditions for optimal response no longer occur only for transmissions over the maximum and minimum cable lengths but also for all intermediate lengths at which K1, K2, . . . KN are all equal to either 0 or 1. Also, by reducing the gain or magnitude response of fi(j$\omega$) as compared to f(j$\omega$) in FIG. 2, the magnitude of the maximum error for intermediate values of Ki is also reduced. This considerably reduces the response error as transmissions occur over various cable lengths.

The multi-stage equalizer implementation of the present invention also allows for the control functions Ki to be placed at the output of the fi(j$\omega$) circuit functions, so that the equalizer output noise is proportional to cable length, thus allowing for lower jitter levels at shorter cable lengths.

In addition, the present invention reduces the sensitivity of the cable length control voltage to noise and interference so that delay modulation effects are reduced proportionately. Lastly, the objective of providing an equalizer having a bandwidth which varies inversely with cable length is achievable in the present invention without the increased jitter levels associated with continuously variable band limiting circuitry. This is accomplished by progressively reducing the fixed bandwidth of successive stages in the multi-stage equalizer.

As previously mentioned, while the equalizer of FIG. 5 comprises three such stages, the cable equalizer according to the present invention generally comprises N stages where N is an integer greater than or equal to 2. It is clear that as N is increased, a greater reduction in jitter resulting from the above described drawbacks is achievable, although this is at the expense of added circuitry.

Figure 4:
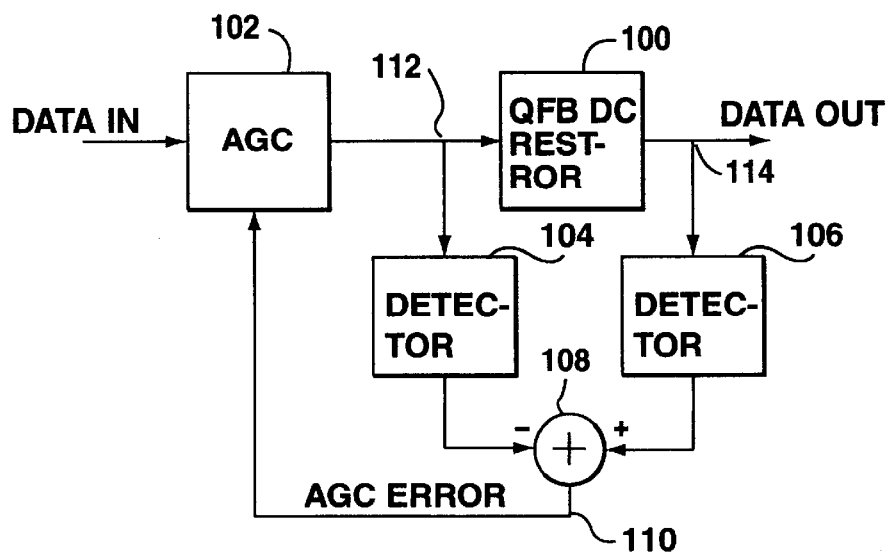
FIG. 4 shows a typical AGC system with DC restoration.
Figure 8:
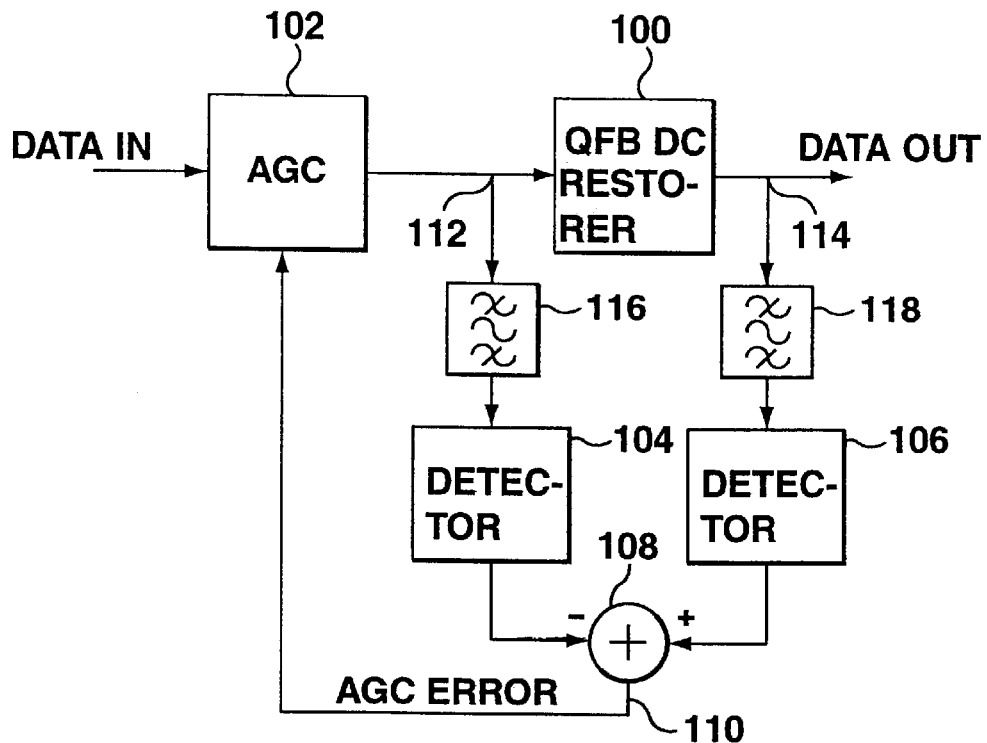
FIG. 8 shows an improved AGC system with DC restoration in accordance with the present invention.

FIG. 8 shows the implementation of a DC restorer in an AGC system, according to the present invention, which provides improved edge jitter performance as compared to the system illustrated in FIG. 4. As already mentioned, the AGC system 102 may include an automatic equalizer (not shown in FIG. 8) which adjusts the frequency characteristic of, in addition to providing gain to, the DATA IN signal. Thus where the AGC circuit includes an equalizer 30 according to the present invention, the input 110 to, the AGC circuit essentially leads to a determination of the value of K, and thereby K1 to KN, of the equalizer circuit 30.

The system of FIG. 8 is similar to the system of FIG. 4 except that two identical filters 116 and 118 are used to band-pass filter the controlled signal 112 and the quantized signal 114 respectively prior to amplitude detection. Filter circuits 116 and 118 have a pass band characteristic which spans the region where the frequency spectrum of signal 112 and the frequency spectrum of signal 114 are essentially the same. Preferably, this pass band region is the mid-band frequency range of the data channel. It is also preferable for filter circuits 116 and 118 to have identical frequency characteristics, but otherwise the frequency response characteristics of filters 116 and 118 should be substantially the same. For example, in a transmission system for scrambled NRZ data, the band-pass filters 116 and 118 may be chosen so that they each exhibit an amplitude frequency response characteristic having a centre frequency at approximately 30 MHz and 60 dB cut-off frequencies at about 16 MHz and 60 MHz. Generally speaking, however, the centre frequency and the cut-off frequencies will vary depending on the application. The filtering of low and high frequency components which are always present in the quantized signal but are not always present in the controlled signal results in the error signal 110 being essentially proportional to the true difference in the amplitude of the controlled signal 112 and the amplitude of the quantized signal 114. Therefore, the error signal 110 in FIG. 8 more accurately regulates the automatic gain control circuit 102 so as to maintain the amplitude of the controlled signal 112 approximately equal to the amplitude of the quantized signal 114.

Figure 3:
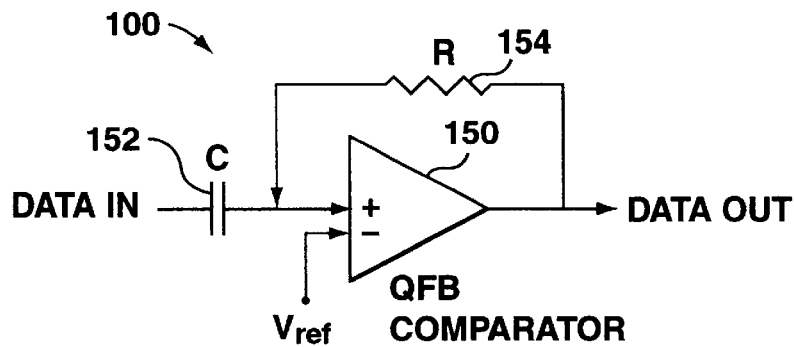
FIG. 3 shows a conventional DC restorer using quantized feedback.
Figure 3A:
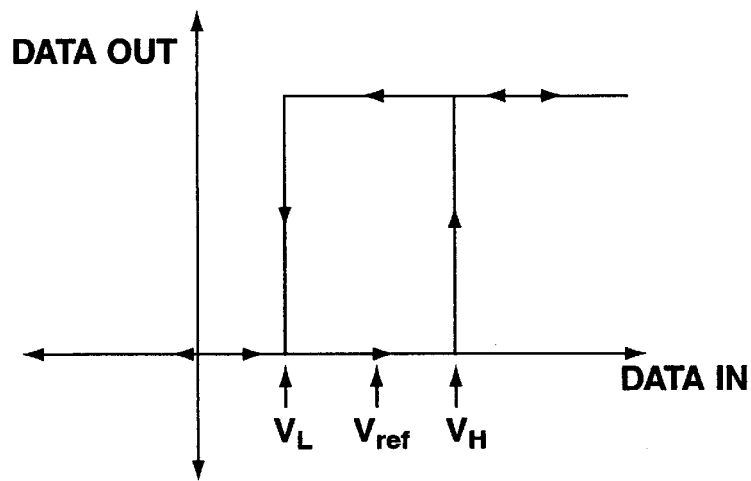
FIG. 3A illustrates the input-output voltage transfer characteristic for the restorer of FIG. 3.
Figure 9:
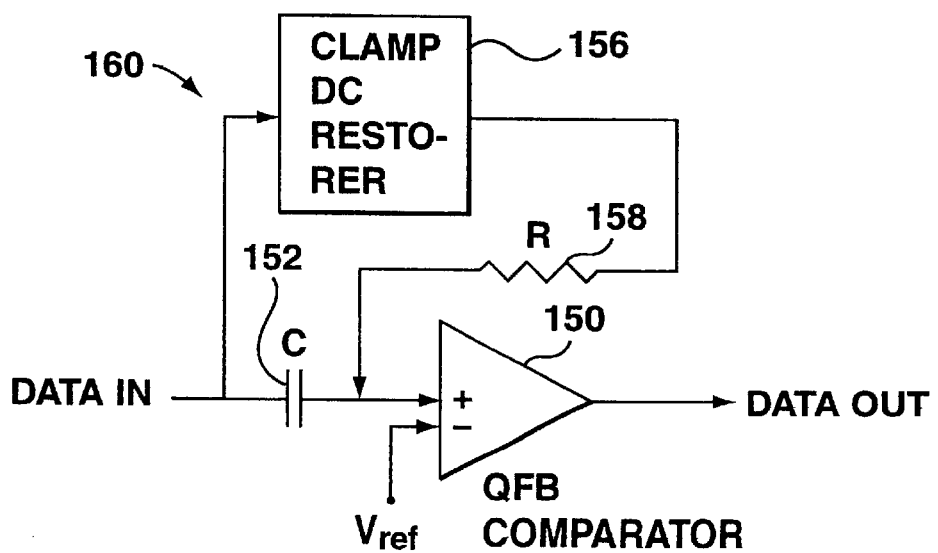
FIG. 9 shows a DC restorer in accordance with the present invention.

FIG. 9 shows a DC restorer 160 in accordance with the present invention which avoids the previously described latch-up problem of the circuit of FIG. 3, while maintaining minimal edge jitter performance. The DC restorer of FIG. 9 comprises a QFB comparator 150, input coupling capacitor 152, resistor 158, and a clamping DC restorer 156. The implementation of clamping restorer 156 will be well known in the art and may comprise a clamping circuit as described in U.S. Pat. No. 5,426,389. The quantized feedback signal of the DC restorer 160 is taken from the output of clamping DC restorer 156 rather than from the output of the QFB comparator as is the case for the DC restorer 100 of FIG. 3. Since the lower frequency components in the outputs of the clamping restorer and the QFB restorer are very similar, the inherently low pass filtered quantized feedback signal can be taken in the above manner without sacrificing edge jitter performance. By removing the direct positive feedback from the DATA OUT signal to the positive input terminal of comparator 150, the possibility of a latch-up occurring at the onset of data transmission is eliminated.

As a result, the DC restorer 160 exhibits the low edge jitter performance of a typical QFB restorer with the latch-up free operation of a clamping restorer. In addition, unlike prior art solutions to the latch-up problem which involve AC coupling the DATA OUT signal, there is no lower limit on data rates which can be restored and the system noise margin does not deteriorate during periods when no data transitions occur.

Although the inventive aspects disclosed herein may form part of a serial digital receiver and/or a cable equalizer for serial digital data communications, these aspects of the present invention are not limited to such applications. Moreover, while preferred embodiments of the present invention have been described, the embodiments disclosed are illustrative and not restrictive, and the scope of the invention is intended to be defined only by the appended claims.

I claim:

1. An equalizer circuit for receiving an input signal and for providing an equalized output signal in response, said input signal having a frequency spectrum, said frequency spectrum having been distorted by the frequency characteristic of a frequency dependent transmission line, the length of said transmission line being within a variable length range, said variable length range being defined by a minimum length limit and a maximum length limit, said variable length range also being divided into a plurality of N successive portions, said plurality of portions including at least a first portion and a last portion, each of said N portions having a portion length and each of said portions further being defined by a lower portion limit and an upper portion limit, the lower portion limit of said first portion being equal to said minimum length limit, and the upper portion limit of said last portion being equal to said maximum length limit, said equalizer circuit comprising a plurality of N successive stages each having a stage input for receiving a stage input signal and a stage output for providing a stage output signal, said plurality of stages including at least a first stage and a last stage and each one of said N stages corresponding to one of said N portions, wherein the stage input of said first stage receives said input signal, the stage output of said last stage provides said equalized output signal, and the stage output of each stage other than the last stage is coupled to the stage input of the next stage, each of said stages further comprising:
   (a) a frequency responsive circuit for altering the frequency spectrum of the stage input signal to provide an altered signal;
   (b) a variable gain circuit for amplifying said altered signal by a gain value to provide an amplified altered signal, said gain value being within the range defined by a minimum gain value and a maximum gain value, such that when said length of said transmission line is less than the lower portion limit of the portion corresponding to said stage said gain value is equal to said minimum gain value, and when said length of said transmission line is greater than the upper portion limit of the portion corresponding to said stage said gain value is equal to said maximum gain value, said gain value otherwise being variable between said minimum gain value and said maximum gain value depending on the length of said transmission line; and
   (c) a summing circuit for adding said stage input signal and said amplified altered signal to provide the stage output signal.

2. An equalizer circuit according to claim 1 wherein said variable length range is divided into said plurality of successive portions such that the upper portion limit of each portion other than the last portion is equal to the lower portion limit of the next portion.

3. An equalizer circuit according to claim 2 wherein said variable length range is divided into said plurality of successive portions such that the portion lengths of each of said N portions are all equal to one another.

* * * * *